March 3, 1953     P. N. HOLMES     2,629,906
TIMBER TRUSS JOINT
Filed April 6, 1951
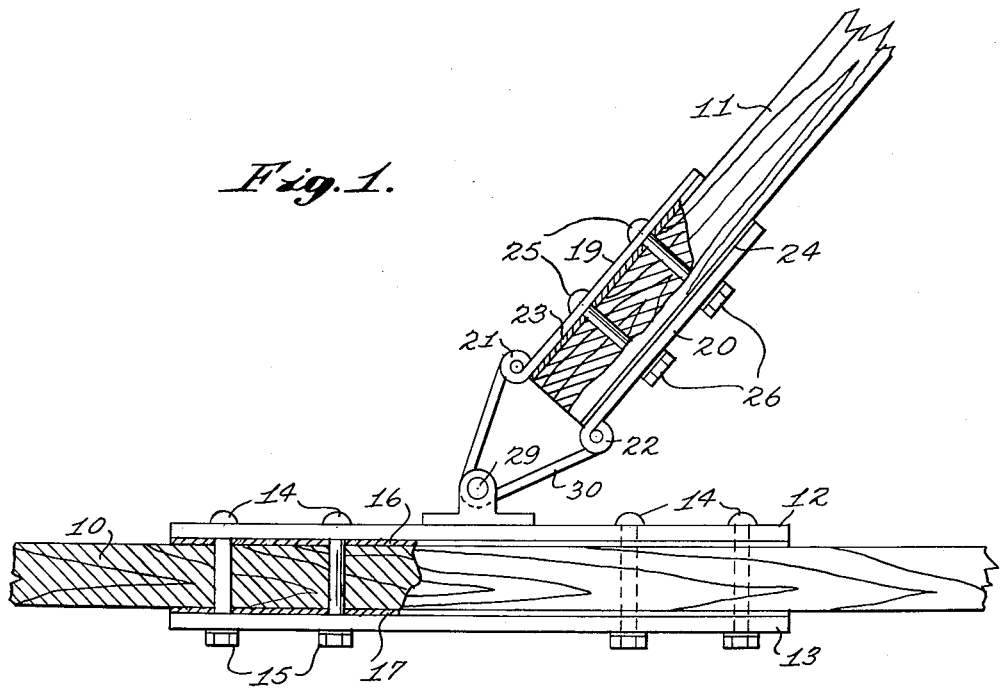
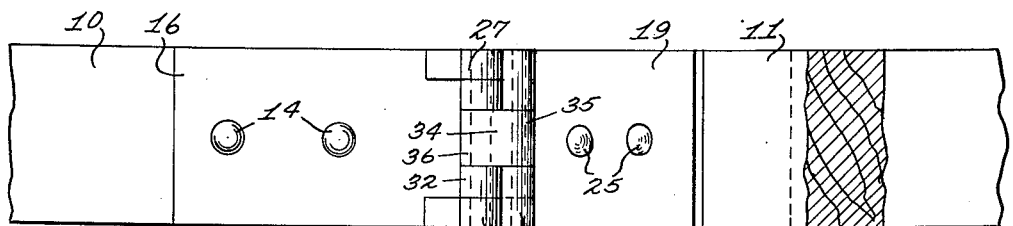
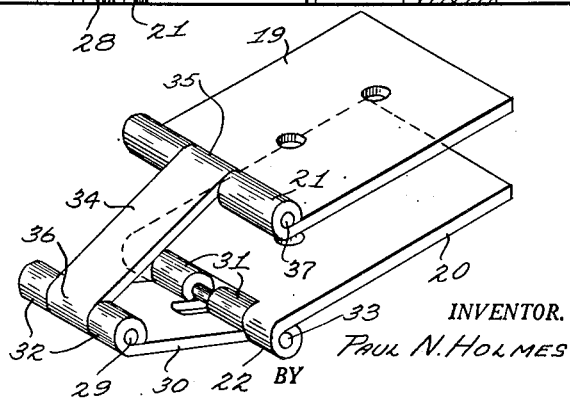
INVENTOR.
PAUL N. HOLMES
BY McMorrow, Berman & Davidson
ATTORNEYS Patented Mar. 3, 1953

2,629,906

UNITED STATES PATENT OFFICE 2,629,906

TIMBER TRUSS JOINT

Paul N. Holmes, Longview, Wash.

Application April 6, 1951, Serial No. 219,600

2 Claims. (Cl. 20—92)

This invention relates to improvements in metal timber truss joints, and among the objects of the invention are to provide an improved timber truss joint wherein metal joint plates are adhesively bonded to timber truss members to render the maximum strength of the timber members available at the truss joint, the joint plates bonded to different timbers being pivotally connected together to eliminate bending and shearing stresses in the timber members; wherein special laminae are disposed between the contiguous surfaces of the metal plates and the wooden truss members to insure a complete bond over the entire plate area and bolts are inserted through the plates and the corresponding portions of the timber members to provide the proper bonding pressure between the plates and the members and to resist in shear forces tending to move the plates longitudinally of the associated members; and which joints are simple and durable in construction, provide an economical truss structure and facilitate the assembly of the truss structures either in the shop or in the field.

Other objects and advantages will become apparent from a consideration of the following description and the appended claims in conjunction with the accompanying drawing, wherein:

Figure 1 is a side elevational view of a truss joint illustrative of the invention, portions being broken away and shown in cross-section to better illustrate the construction thereof;

Figure 2 is a top plan view of the truss joint illustrated in Figure 1; and

Figure 3 is a perspective view of a metal structure constituting a component of the truss joint.

With continued reference to the drawing, there is illustrated in Figures 1 and 2 two timber truss members 10 and 11 disposed in a predetermined angular relationship to each other and constituting components of a truss such as a roof or bridge truss, various standard forms of such trusses being well known to the art.

Metal plates 12 and 13 of elongated, rectangular shape are disposed one at each of two opposite sides of the truss member 10, and these plates have a width substantially equal to the width of the truss member and are disposed in substantially coterminous relationship relative to each other. The plates are provided with apertures spaced longitudinally thereof, and the truss member 10 is provided with apertures registering with corresponding apertures in the plates. Clamping bolts 14 are inserted through registering apertures in the plates 12 and 13, and the member 10 and nuts 15 are threaded onto these bolts to clamp the plates against the timber member with a predetermined force.

Preferably, the bolt holes in the plates are countersunk and the bolts are provided with tapered head portions fitting the countersunk holes in the corresponding plate, while beveled or partly conical-shaped washers surround the bolts at their other ends and are received in the countersunk holes in the plate adjacent the nuts 15, so that the bolts will be in firm contact with the plates 12 and 13 and will resist in shear any forces tending to move the plates longitudinally or laterally of the associated member 10.

Layers 16 and 17 of sheet material are disposed between the inner surfaces of the plates 12 and 13, respectively, and the member 10, and these layers of sheet material are adhesively bonded to the timber member and the corresponding plates to firmly bond the plates to the truss member over the entire plate area.

While various sheet materials may be used for the layers 16 and 17, it is contemplated that these layers may be formed from wood veneer and bonded to the truss members, and that the associated plates may then be bonded to the layers of sheet material, a suitable thermosetting adhesive being used in both cases. Such an adhesive may be a thermosetting synthetic resin, which, when mixed with a suitable catalyst, will polymerize at room temperature to provide between the plates and the member 10 a bond having a strength at least as great as the strength of the truss member. It is also contemplated that instead of a layer of sheet material of the character indicated above, a prime coating of a two-stage resin adhesive may be applied to the truss members and cured and the plates may then be bonded to this coating by a suitable plastic adhesive. If desired, the cured coating may be covered with a removable protective coating to maintain it in a clean condition until the plates are applied.

Joint plates 19 and 20 are disposed one at each side of the truss member 11 and have a width substantially equal to the width of this member. Each of these plates 19 and 20 has at one end spaced hinge barrels, as indicated at 21 and 22, respectively, and these hinge barrels project beyond the adjacent end of the truss member 11.

Layers 23 and 24 of suitable sheet material are interposed between the plates 19 and 20, respectively, and the adjacent surfaces of the timber truss member 11, and these layers may be of the same material as the layers 16 and 17 described above and securely bonded to the contiguous surfaces of the truss member and the associated plate in the manner described above in connection with the bonding of the layers 16 and 17.

The truss member 11 and the plates 19 and 20 are provided with registering apertures spaced apart longitudinally of the plates, and clamping bolts 25 extend through the registering apertures with their heads bearing against the outer side of the plate 19. Nuts 26 are threaded onto the ends of the bolts remote from the heads to clamp the plates 19 and 20 against the associated truss member 11. As explained above, the bolts may have beveled head portions received in countersunk bolt holes in the plate 19, and beveled or partly conical washers may be received in countersunk bolt holes in the plate 20 and interposed between this plate and the nuts 26.

In order to obtain the proper bonding pressure between the joint plates and the timber truss members, the nuts 15 and 24 of the bolts 14 and 25 are preferably tightened with a torque indicating wrench to a predetermined pressure.

A pair of apertured lugs 27 and 28 are secured on the plate 12 at or adjacent the mid-length location of this plate and adjacent to respectively opposite sides thereof, and a hinge pin 29 extends through and is journaled at its ends in these lugs. A hinge link 30 has spaced hinge barrels 31 and 32 at its opposite ends, which are positioned between the hinge barrels 22 on the plate 20. A hinge pin 33 extends through the barrels 22 and 31 and pivotally connects the related end of the link 30 to the related end of the plate 20. A second hinge link 34, narrower than the link 30, has a single hinge barrel 35 and 36 at its respectively opposite ends, positioned between the hinge barrels 21 of the plate 19 and the hinge barrels 32 of the link 30. A hinge pin 37 extends through the barrels 21 and 35 to pivotally secure one end of the link 34 to the end of the plate 19. The hinge pin 29 also extends through the lugs 27 and 28 so as to pivotally connect both of the links 30 and 34 to the joint plate 12.

The links 30 and 34, the lugs 27 and 28 and the hinge pins 33, 36 and 29 thus pivotally connect the truss member 11 to the truss member 10 in a manner to eliminate bending and shearing stresses imposed upon these truss members.

In the arrangement illustrated, the bolts 14 are arranged in two groups of two bolts each with the lugs 27 and 28 disposed between the two groups of bolts, so that the stresses between the plate 12 and the truss member 10 are substantially the same at both sides of the mid-length location of the plate.

The invention may be embodied in other specific forms without departing from the spirit or essential characteristics thereof. The present embodiment is, therefore, to be considered in all respects as illustrative and not restrictive, the scope of the invention being defined by the appended claims rather than by the foregoing description, and all changes which come within the meaning and range of equivalency of the claims are, therefore, intended to be embraced therein.

What is claimed is:

1. In combination, a first truss member having a first metal plate secured on one side thereof, a second truss member having a terminal end located close to the said side of the first truss member, the second truss member being angulated relative to said first truss member, a pair of laterally spaced lugs projecting from the side of said first plate remote from the first truss member, second and third plates secured on opposite sides of said second truss member and extending to said terminal end thereof, said second and third plates having pairs of laterally spaced hinge barrels projecting beyond said terminal end of the second truss member, first and second links, said first link having pairs of laterally spaced hinge barrels on its opposite ends, one pair being positioned between the hinge barrels of said third plate and the other pair being positioned between said lugs, said second link having single hinge barrels on its opposite ends, one single barrel being positioned between the hinge barrels of said second plate and the other single hinge barrel being positioned between the hinge barrels of said first link which are located between the said lugs, a first hinge pin traversing said lugs and the hinge barrels located therebetween, and other hinge pins passing through the remaining associated hinge barrels.

2. In combination, a first truss member having a first metal plate secured on one side thereof, a second truss member having a terminal end located close to the said side of the first truss member, the second truss member being angulated relative to said first truss member, a pair of laterally spaced lugs projecting from the side of said first plate remote from the first truss member, second and third plates secured on opposite sides of said second truss member and extending to said terminal end thereof, said second and third plates having pairs of laterally spaced hinge barrels projecting beyond said terminal end of the second truss member, first and second links, said first link having pairs of laterally spaced hinge barrels on its opposite ends, one pair being positioned between the hinge barrels of said third plate and the other pair being positioned between said lugs, said second link having single hinge barrels on its opposite ends, one single barrel being positioned between the hinge barrels of said second plate and the other single hinge barrel being positioned between the hinge barrels of said first link which are located between the said lugs, a first hinge pin traversing said lugs and the hinge barrels located therebetween, and other hinge pins passing through the remaining associated hinge barrels, said first link being substantially wider than said second link, said first link being positioned adjacent to the plate on the first truss member and in the angle formed between the truss members.

PAUL N. HOLMES.

REFERENCES CITED

The following references are of record in the file of this patent:

UNITED STATES PATENTS

| Number | Name | Date |
|---|---|---|
| 1,930,345 | Lewis | Oct. 10, 1933 |

FOREIGN PATENTS

| Number | Country | Date |
|---|---|---|
| 337,341 | Germany | of 1921 |